No. 698,680. Patented Apr. 29, 1902.
T. DUNCAN.
ELECTRICAL MEASURING INSTRUMENT.
(Application filed Jan. 2, 1900. Renewed Dec. 16, 1901.)
(No Model.)
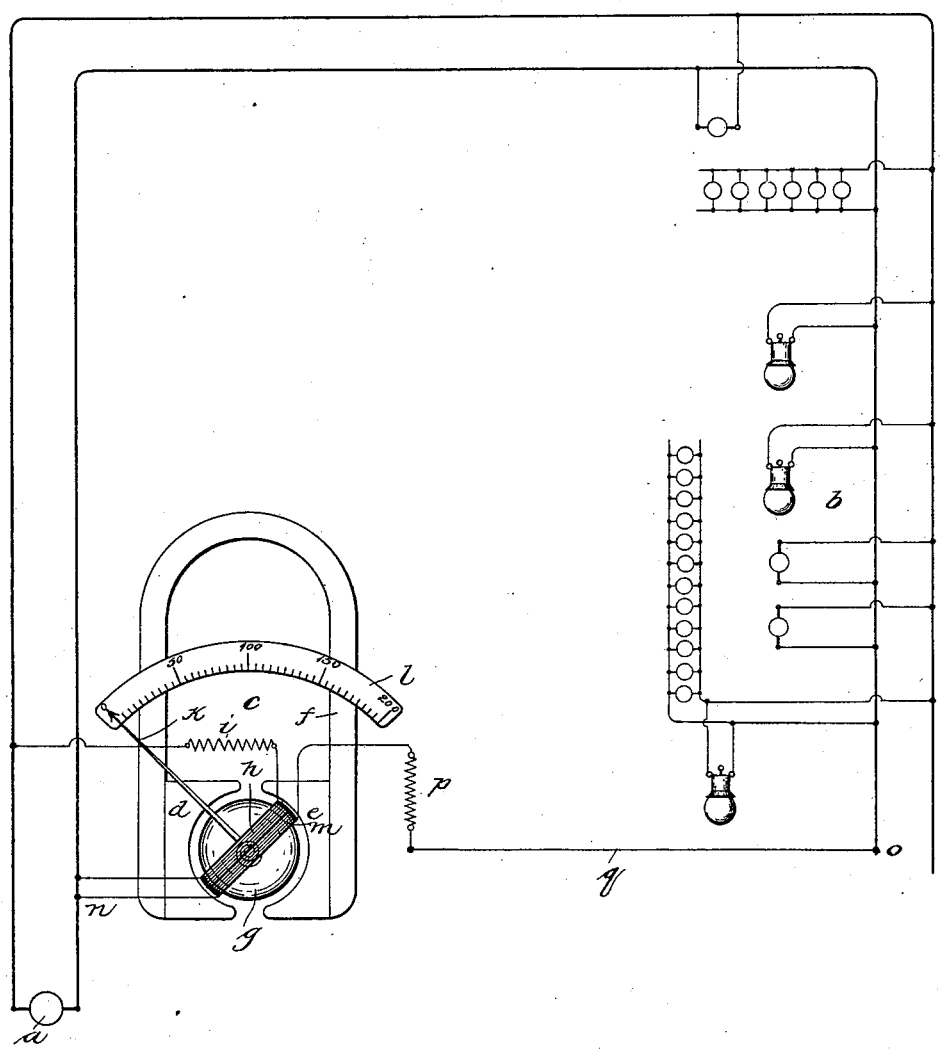

UNITED STATES PATENT OFFICE.

THOMAS DUNCAN, OF CHICAGO, ILLINOIS, ASSIGNOR TO THE SIEMENS & HALSKE ELECTRIC COMPANY OF AMERICA, OF CHICAGO, ILLINOIS, A CORPORATION OF ILLINOIS.

ELECTRICAL MEASURING INSTRUMENT.

SPECIFICATION forming part of Letters Patent No. 698,680, dated April 29, 1902.

Application filed January 2, 1900. Renewed December 16, 1901. Serial No. 86,061. (No model.)

*To all whom it may concern:*

Be it known that I, THOMAS DUNCAN, a citizen of the United States, residing at Chicago, in the county of Cook and State of Illinois, have invented a certain new and useful Improvement in Electrical Measuring Instruments, (Case No. 342,) of which the following is a full, clear, concise, and exact description, reference being had to the accompanying drawing, forming a part of this specification.

My invention relates to compensating voltmeters, and has for its object the provision of improved means for determining the electromotive force at any predetermined point of a system of distribution, my invention enabling me to accurately secure this result.

When the pressure at any point distant from the generating-station is accurately determined, this pressure may be maintained constant by regulation of the impressed pressure to compensate for load changes and the C R drop over the distributing-lines due thereto, which varies directly as the load.

Two ways have hitherto been frequently practiced for measuring the pressure at a predetermined point in the line distant from the generating-station. A common way is to employ an ordinary voltmeter upon the station-switchboard, which is connected at a distant point—as, for example, the center of distribution—by means of two pressure-wires, the instrument then indicating the pressure at the distant point. When the distance between the distant predetermined point of the line and the generating-station is great, the expense of these pressure-wires is significant when a great number of machines are used. It has also been the practice to employ what are termed "compound compensating voltmeters" containing two windings, one a pressure-winding connected between the generator-terminals and the other a counter compounding or demagnetizing winding comprising one or more turns of the series or main conductor upon the same voltmeter-spool with the shunt-winding, the current increasing the counter magnetizing effect of the series winding as the load increases to give a resultant magnetizing effect, which indicates the "pressure reduction" in the transmission-lines. The number of turns of the series or current winding is dependent upon the percentage of drop in the mains. This latter method, however, is objectionable, since a true compensation is not always effected in the meter for the c r drop, since the countermagnetizing effect of the series winding would be the same irrespective of the distance of the load from the generator.

In practicing my present invention I am enabled to eliminate one or both of the pressure-wires employed in one of the aforesaid prior methods, to reduce the cost of line construction, and at the same time maintain accuracy in the determination of the pressure at the distant points of distribution where the pressure is to be measured.

In practicing my invention I employ a meter having a winding connected or adapted for connection between two distant points of the system of distribution, preferably between a point on one transmission-conductor at the generator-station and another point of the same transmission-conductor at the distant place where the pressure is to be determined. A torque is created by this winding which is proportional to the C R drop between the connected points. In my present invention I also employ a second winding, which is connected across the generator-terminals. I am also enabled to overcome the disadvantages of the second aforesaid prior method of determining the pressure at points distant from the generator-station, in that I am enabled to accurately determine this pressure irrespective of the distribution of the load.

In my application, Serial No. 87, filed of even date herewith, I have disclosed an apparatus for accomplishing the desired result in which a pointer and a scale were associated with each of the windings, whereby the C R drop and the pressure at the generator-terminals could be separately measured. With my prior apparatus in order to ascertain the difference in potential at the predetermined distant point twice the C R drop in one transmission-conductor was subtracted from the indicated pressure at the generator-terminals, the portion of the apparatus for measuring the C R drop in one transmission-line being so calibrated as to indicate directly the total C R drop, so that it was only necessary to take the difference between the readings to determine the pressure at the distant predetermined point.

My invention herein is an improvement upon the apparatus of my aforesaid application in that I am enabled to provide an instrument capable of giving the pressure at any predetermined point of a transmission-line in a single reading. To effect this result, I preferably cause said windings to coöperate to effect a single movement proportional to the pressure at the distant point of the system. In the preferred embodiment of the invention the said windings jointly create a single torque and are mechanically coupled, being preferably mounted upon a common oscillating shaft having a pointer movable therewith which is adapted to indicate the movements of the shaft upon a suitable measuring-scale. The resultant action of the said windings is proportional to the algebraic sum of the pressure across the generator-terminals and the C R drop, the torque due to the meter-windings acting in opposite directions.

I will explain my invention more particularly by reference to the accompanying drawing, which diagrammatically indicates an instrument constructed in accordance with the invention and a system of distribution with which the said instrument is connected.

I have indicated a system for distributing direct current, a source of direct current $a$ being shown as supplying current to translating devices $b$. The instrument $c$ may be constructed as shown, two field-poles $d$ $e$ of soft iron being preferably provided, a permanent horseshoe-magnet $f$ being preferably employed, upon the ends of which said pole-pieces are secured. An iron core $g$, which is preferably stationary, is disposed between the poles. A coil $h$ of fine wire, mounted upon a rotatable shaft, surrounds the iron core and is disposed between the pole-pieces, this coil being included in circuit between the generator-terminals, a resistance $i$, extraneous to the said coil, being included in the same cross-conductor therewith to prevent waste of current through said coil. A torque is thus produced proportional to the pressure of the generator impressed upon the transmission-mains. Torsional springs may be provided in the well-known way to oppose the torques of the instrument.

I have shown a pointer $k$, mounted to swing with the coil, and a scale $l$, upon which the measurements may be read. A second coil $m$ is mechanically coupled with the aforesaid coil, the latter coil being preferably mounted upon the same shaft with the coil $h$. The coil $m$ may be included in bridge of a transmission-main, in this instance between the separated points $n$ and $o$ at the generator and at a distant point of the transmission system, respectively, an extraneous resistance $p$ being preferably adapted for inclusion in the same circuit with the said coil.

I have shown a metallic pressure-conductor $q$ for connecting the points $n$ and $o$. A part of this pressure-conductor may be replaced by ground connections, if desired, as is well understood in the art. The point $o$ may be at the center of distribution or at the extreme end of the system of distribution or a point between the extreme end and the center of distribution or at any other point distant from the generating-station. If there is a load upon the circuit, a torque will be created in the instrument due to the current flowing through the coil $m$. This torque being proportional to the C R drop and acting in opposition to the the torque due to the winding $h$, the pointer will thereby indicate the resultant effect of the component torques due to said windings, thereby measuring the pressure at the aforesaid distant point of the transmission-circuit and not at the generator. If, for example, the dynamo-pressure is one hundred and four volts and the drop over the lines is four volts, then the resultant volts indicated on the instrument will be 104−4= 100. When there is no load on the dynamo, there will be no drop over the transmission-lines, no current then flowing from the coil $m$, the instrument then serving to measure the generator-pressure only. When a load is put upon the system, the current through the coil $m$ will cause a torque proportional to the drop over the line between the line-terminals of the coil $m$, this torque opposing the torque due to the coil $h$.

I preferably so adjust the windings of the instrument that the winding receiving its current from the conductor $q$ will produce relatively twice the torque for a given pressure impressed at its terminals than that caused by the winding subjected to the generating pressure.

In some of the claims I speak of the windings of the meter as being connected with the transmission-circuit and generator, and while I have specifically disclosed the application of my invention to a direct-current system of electrical distribution I do not wish to be limited to conductive connections of the meter-windings with the transmission-circuit.

While I have herein shown and particularly described one embodiment of my invention, it is obvious that changes may be readily made without departing from the spirit thereof, and I do not, therefore, wish to be limited to the precise construction shown; but,

Having thus described my invention, I claim as new and desire to secure by Letters Patent—

1. In a system of electrical distribution, the combination with a generator supplying current to a transmission-circuit, of a measuring instrument having a voltmeter-winding connected across the generator-terminals, and a second pressure-winding connected between a point of the transmission-circuit and a distant point of the transmission-circuit where the pressure is to be determined, and means whereby said windings may coöperate to produce a single actuation of the movable element of the meter to measure the pressure at said distant point, substantially as described.

2. In a system of electrical distribution, the combination with a generator supplying current to a transmission-circuit, of a measuring instrument having a voltmeter-winding connected across the generator-terminals and a second pressure-winding connected between a point of the transmission-circuit and a second distant point where the pressure is to be determined, said windings coöperating to actuate the movable element of the meter to determine the pressure at said distant point, substantially as described.

3. In a system of electrical distribution, the combination with a generator supplying current to a transmission-circuit, of a measuring instrument having a voltmeter-winding connected across the generator-terminals and a second pressure-winding connected between a point of the transmission-circuit and a second distant point where the pressure is to be determined, said windings coöperating to produce a resultant torque upon the movable element of the meter to produce movement thereof to measure the pressure at said distant point, substantially as described.

4. In a system of electrical distribution, the combination with a generator supplying current to a transmission-circuit, of a measuring instrument having a voltmeter-winding connected across the generator-terminals and a second pressure-winding connected between a point of the transmission-circuit and a second distant point where the pressure is to be determined, said windings being adapted each to create a torque opposing the torque due to the other whereby a resultant torque is produced to actuate said element to measure the pressure at said distant point, substantially as described.

5. In a system of electrical distribution, the combination with a generator supplying current to a transmission-circuit, of a measuring instrument having a voltmeter-winding connected across the generator-terminals and a second pressure-winding connected between a point of the transmission-circuit and a distant point of the transmission-circuit where the pressure is to be determined, said windings being mechanically coupled and rotatably mounted to jointly measure the pressure at said distant point, substantially as described.

6. In a system of electrical distribution, the combination with a generator supplying current to a transmission-circuit, of a measuring instrument having a voltmeter-winding connected across the generator-terminals and a second pressure-winding connected between a point of the transmission-circuit and a distant point of the transmission-circuit where the pressure is to be determined, said windings being mechanically coupled and rotatably mounted to jointly measure the pressure at said distant point, an index-needle or pointer moving with said windings, and a scale coöperating with the pointer to measure the pressure at said distant point, substantially as described.

7. In a system of electrical distribution, the combination with a generator supplying current to a transmission-circuit, of a measuring instrument having a voltmeter-winding connected across the generator-terminals and a second pressure-winding connected between a point of the transmission-circuit and a distant point of the transmission-circuit where the pressure is to be determined, said windings being mechanically coupled and rotatably mounted and producing counteracting torques to jointly measure the pressure at said distant point, substantially as described.

8. In a system of electrical distribution, the combination with a generator supplying current to a transmission-circuit, of a measuring instrument having a voltmeter-winding connected across the generator-terminals and a second pressure-winding connected between a point of the transmission-circuit and a distant point of the transmission-circuit where the pressure is to be determined, said windings being mechanically coupled and rotatably mounted, and producing counteracting torques, to jointly measure the pressure at said distant point, an index-needle or pointer moving with said windings, and a scale coöperating with the pointer to measure the pressure at said distant point, substantially as described.

9. In a system of electrical distribution, the combination with a generator supplying current to a transmission-circuit, of a measuring instrument having a voltmeter-winding connected across the generator-terminals and a second pressure-winding connected between a point of the transmission-circuit and a distant point of the transmission-circuit where the pressure is to be determined, said second winding being in shunt of a portion of one side of the transmission-circuit, and means whereby said windings may coöperate to produce a single actuation of the movable element of the meter to measure the pressure at said distant point, substantially as described.

10. In a system of electrical distribution, the combination with a generator supplying current to a transmission-circuit, of a measuring instrument having a voltmeter-winding connected across the generator-terminals and a second pressure-winding connected between a point of the transmission-circuit and a second distant point where the pressure is to be determined, said windings coöperating to actuate the movable element of the meter to determine the pressure at said distant point, said second winding being in shunt of a portion of one side of the transmission-circuit, substantially as described.

11. In a system of electrical distribution, the combination with a generator supplying current to a transmission-circuit, of a measuring instrument having a voltmeter-winding connected across the generator-terminals and a second pressure-winding connected between a point of the transmission-circuit and a second distant point where the pressure is to be determined, said windings coöperating to produce a resultant torque upon the movable element of the meter to produce movement thereof to measure the pressure at said distant point, said second winding being in shunt of a portion of one side of the transmission-circuit, substantially as described.

12. In a system of electrical distribution, the combination with a generator supplying current to a transmission-circuit, of a measuring instrument having a voltmeter-winding connected across the generator-terminals, and a second pressure-winding connected between a point of the transmission-circuit and a second distant point where the pressure is to be determined, said windings being adapted each to create a torque opposing the torque due to the other, whereby a resultant torque is produced to actuate said element to measure the pressure at said distant point, said second winding being in shunt of a portion of one side of the transmission-circuit, substantially as described.

13. In a system of electrical distribution, the combination with a generator supplying current to a transmission-circuit, of a measuring instrument having a voltmeter-winding connected across the generator-terminals and a second pressure-winding connected between a point of the transmission-circuit and a distant point of the transmission-circuit where the pressure is to be determined, said windings being mechanically coupled and rotatably mounted to jointly measure the pressure at said distant point, said second winding being in shunt of a portion of one side of the transmission-circuit, substantially as described.

14. In a system of electrical distribution, the combination with a generator supplying current to a transmission-circuit, of a measuring instrument having a voltmeter-winding connected across the generator-terminals and a second pressure-winding connected between a point of the transmission-circuit and a distant point of the transmission-circuit where the pressure is to be determined, said windings being mechanically coupled and rotatably mounted to jointly measure the pressure at said distant point, an index-needle or pointer moving with said windings, and a scale coöperating with the pointer to measure the pressure at said distant point, said second winding being in shunt of a portion of one side of the transmission-circuit, substantially as described.

15. In a system of electrical distribution, the combination with a generator supplying current to a transmission-circuit, of a measuring instrument having a voltmeter-winding connected across the generator-terminals and a second pressure-winding connected between a point of the transmission-circuit and a distant point of the transmission-circuit where the pressure is to be determined, said windings being mechanically coupled and rotatably mounted, and producing counteracting torques, to jointly measure the pressure at said distant point, said second winding being in shunt of a portion of one side of the transmission-circuit, substantially as described.

16. In a system of electrical distribution, the combination with a generator supplying current to a transmission-circuit, of a measuring instrument having a voltmeter-winding connected across the generator-terminals and a second pressure-winding connected between a point of the transmission-circuit and a distant point of the transmission-circuit where the pressure is to be determined, said windings being mechanically coupled and rotatably mounted and producing counteracting torques, to jointly measure the pressure at said distant point, said second winding being in shunt of a portion of one side of the transmission-circuit, an index-needle or pointer moving with said windings, and a scale coöperating with the pointer to measure the pressure at said distant point, substantially as described.

17. In a system of electrical distribution, the combination with a direct-current generator supplying current to a transmission-circuit, of a measuring instrument having a voltmeter-winding conductively united with and included between the generator-terminals and a second pressure-winding conductively uniting a point of the transmission-circuit with a distant point of the transmission-circuit where the pressure is to be determined, and means whereby said windings may coöperate to produce a single actuation of the movable element of the meter to measure the pressure at said distant point, substantially as described.

18. In a system of electrical distribution, the combination with a direct-current generator supplying current to a transmission-circuit, of a measuring instrument having a voltmeter-winding conductively united with and included between the generator-terminals and a second pressure-winding conductively uniting a point of the transmission-circuit with a second distant point where the pressure is to be determined, said windings coöperating to actuate the movable element of the meter to determine the pressure at said distant point, substantially as described.

19. In a system of electrical distribution, the combination with a direct-current generator supplying current to a transmission-circuit, of a measuring instrument having a voltmeter-winding conductively united with and included between the generator-terminals and a second pressure-winding conductively uniting a point of the transmission-circuit with a second distant point where the pressure is to be determined, said windings coöperating to produce a resultant torque upon the movable element of the meter to produce movement thereof to measure the pressure at said distant point, substantially as described.

20. In a system of electrical distribution, the combination with a direct-current generator supplying current to a transmission-circuit, of a measuring instrument having a voltmeter-winding conductively united with and included between the generator-terminals and a second pressure-winding conductively uniting a point of the transmission-circuit with a second distant point where the pressure is to be determined, said windings being adapted each to create a torque opposing the torque due to the other, whereby a resultant torque is produced to actuate said element to measure the pressure at said distant point, substantially as described.

21. In a system of electrical distribution, the combination with a direct-current generator supplying current to a transmission-circuit, of a measuring instrument having a voltmeter-winding conductively united with and included between the generator-terminals and a second pressure-winding conductively uniting a point of the transmission-circuit with a distant point of the transmission-circuit where the pressure is to be determined, said windings being mechanically coupled and rotatably mounted to jointly measure the pressure at said distant point, substantially as described.

22. In a system of electrical distribution, the combination with a direct-current generator supplying current to a transmission-circuit, of a measuring instrument having a voltmeter-winding conductively united with and included between the generator-terminals and a second pressure-winding conductively uniting a point of the transmission-circuit with a distant point of the transmission-circuit where the pressure is to be determined, said windings being mechanically coupled and rotatably mounted, and producing counteracting torques, to jointly measure the pressure at said distant points, substantially as described.

In witness whereof I hereunto subscribe my name this 20th day of December, A. D. 1899.

THOMAS DUNCAN.

Witnesses:
WILLIAM F. MEYER,
JAMES W. DALTON.